United States Patent [19]
Yoshimura et al.

[11] Patent Number: 5,330,029
[45] Date of Patent: Jul. 19, 1994

[54] FAIRING FOR A MOTORCYCLE

[75] Inventors: Heijiro Yoshimura; Yukihiro Yamazaki; Yasutsugu Takahashi, all of Saitama; Nobuya Itoh, Tokyo; Masanobu Shibayama; Takahisa Suzuki, both of Saitama; Hiroaki Tsukui, Tokyo, all of Japan

[73] Assignee: Honda Giken Kogyo Kabushiki Kaisha, Tokyo, Japan

[21] Appl. No.: 51,334

[22] Filed: Apr. 23, 1993

Related U.S. Application Data

[63] Continuation of Ser. No. 717,333, Jun. 18, 1991, abandoned.

[30] Foreign Application Priority Data

Jun. 18, 1990 [JP] Japan .................. 2-159078
Mar. 20, 1991 [JP] Japan .................. 3-081972

[51] Int. Cl.⁵ .................................. B62K 11/00
[52] U.S. Cl. ............................ 180/219; 180/229
[58] Field of Search ............... 180/219, 229, 225; 296/78.1; 244/130

[56] References Cited

U.S. PATENT DOCUMENTS

| | | | |
|---|---|---|---|
| 2,225,914 | 12/1940 | Lewis et al. | 180/219 |
| 2,237,677 | 4/1941 | Lewis | 180/219 |
| 3,128,973 | 4/1964 | Dannenberg | 244/130 |
| 3,794,274 | 2/1974 | Eknes | 244/130 |
| 4,066,291 | 1/1978 | Hickman | 296/78.1 |
| 4,114,836 | 9/1978 | Graham et al. | 244/130 X |
| 4,618,020 | 10/1986 | Noda et al. | 180/229 |
| 4,644,889 | 2/1987 | Krans | 244/130 X |
| 4,830,135 | 5/1989 | Yamashita | 180/229 |

FOREIGN PATENT DOCUMENTS

| | | |
|---|---|---|
| 0264301 | 4/1988 | European Pat. Off. |
| 2616734 | 12/1988 | France |
| 0262278 | 10/1989 | Japan .............. 296/78.1 |

OTHER PUBLICATIONS

"Bike", No. 187, Feb. 1987, R. Brown, Mob Rule, p. 39, lower photo Voluptuous all–enclosing bodywork....

Primary Examiner—Richard M. Camby
Assistant Examiner—Carla Mattix

[57] ABSTRACT

A fairing for a motorcycle includes a fairing cover extending from a front end of a frame for a motorcycle rearwardly to cover both sides of an engine operatively mounted adjacent to the front end of the frame of the motorcycle. A plurality of air flow apertures are provided in the fairing for reducing air resistance during cornering of the motorcycle. The plurality of air flow apertures are provided in substantially the entire surface of the fairing. The surface area occupied by the plurality of air flow apertures is more than approximately seventeen percent of the entire surface area of the fairing.

19 Claims, 22 Drawing Sheets

FIG. 14
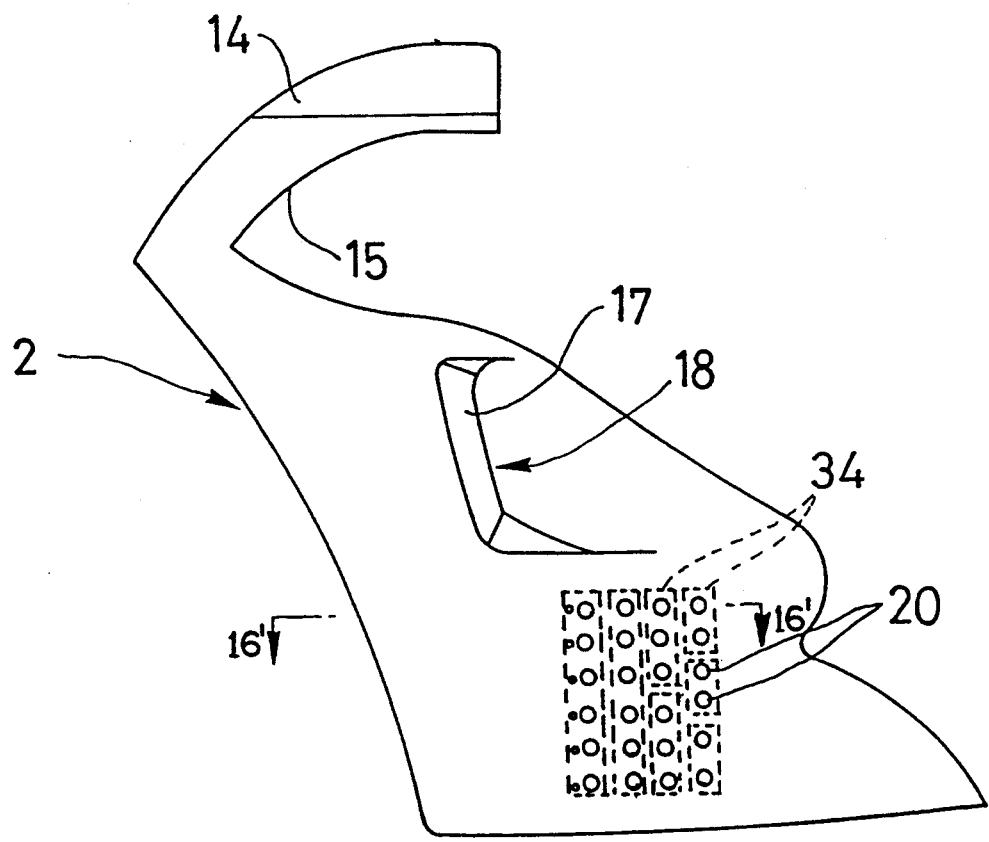
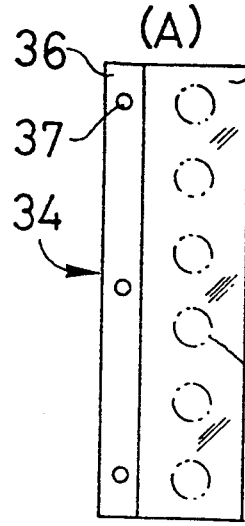
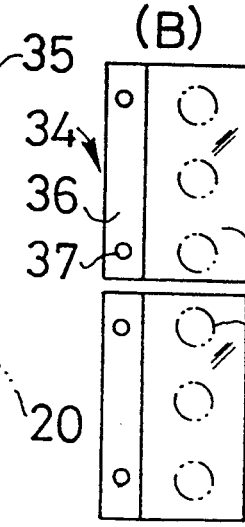
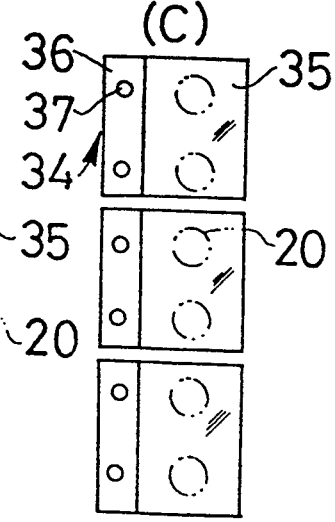
FIG. 15 (A)  FIG. 15 (B)  FIG. 15 (C)

FAIRING FOR A MOTORCYCLE

This application is a continuation of application Ser. No. 07/717,333 filed on Jun. 18, 1991, now abandoned.

BACKGROUND OF THE INVENTION

Field of the Invention

The present invention relates to a fairing for a motorcycle which can reduce the air resistance when the motorcycle is cornering and can improve the cooling efficiency for the engine and the frame.

Description of Background Art

A fairing for a motorcycle is provided to cover the front portion of the motorcycle with continuously curved surfaces from the front thereof to both sides of the engine in order to reduce air resistance.

Examples of fairings are shown in Japanese Patent Application Laid Open For Public Inspection 1982-7774 and Japanese Utility Model Application Laid Open For Public Inspection 1984-174979.

The former includes a mesh type outlet for an air flow duct in the fairing side surface. The latter includes air flow-through holes in the fairing bottom portion.

OBJECTS OF THE INVENTION

A fairing for a motorcycle is mainly provided to reduce the air resistance during operation of the motorcycle along a straight line. Therefore, the front surface area is designed as small as possible. The side surface area, however, is comparatively large.

When the motorcycle is banked for cornering, the fairing thereof receives the ram air as the side wind to increase the running air resistance.

It is desirable to reduce the air resistance during high speed cornering of the motorcycle. Reduction in air resistance is particularly important for a racing motorcycle. Further, the cooling efficiency of the engine may be improved by increasing the air flow capacity within the fairing. An object of the present invention is to achieve the features mentioned-above.

SUMMARY OF THE INVENTION

The invention provides a plurality of air flow-through apertures or holes in the fairing which can pass air from the outside to the inside of the fairing.

The invention spreads the air flow-through holes in substantially the whole surface of the fairing.

The invention provides a total area of the air flow-through apertures or holes which is more than 17% (seventeen percent) of the whole fairing surface area.

The invention may form the air flow-through holes by a netted fiber element. The invention may provide the air flow-through holes in a slot form. The invention forms the opening edge of the air flow-through holes as the cutting edge.

The invention makes an outlet for air exhausted from a radiator adjacent the radiator side and an inner duct communicated inwardly from the outlet to the frame and the air flow-through holes are made in the inner duct.

The invention forms the air flow-through holes in each outlet corresponding to each radiator in which there are provided two divided upper and lower radiators.

The invention forms the air flow-through holes in the middle surface of the fairing connecting between the meter cover portion and the upper portion of the air conducting opening for the radiator.

The invention forms the air flow-through holes formed in the front lower portion of the fairing side surface. The invention forms the air flow-through holes in the appropriate places.

The invention may control the air flow-through holes in the open and close condition especially in response to the air pressure. The invention may control the air flow-through holes by an electrical actuating device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 14 is a side view of a further embodiment of the air pressure responsive open control air flow-through holes;

FIGS. 15(A) to 15(C) illustrate the main portion thereof;

DETAILED DESCRIPTION OF THE PREFERRED EMBODIMENTS

When a motorcycle is cornering, the air pressure as a side wind increases and a part of a ram air passes through the air flow-through apertures or holes provided in the fairing. In this way, the increase in the air pressure is controlled and further the air flow capacity within the fairing can be improved. If the air flow-through holes are made in substantially the whole area of the fairing, the function of the air pressure increase can be further improved. The air flow-through holes may be formed simultaneously in the fairing injection molding process. The air flow can be directed by the slot configuration of the air flow-through holes.

The ram air may pass the fairing surface with less turbulence because of the cutting edge opening of the air flow-through holes.

Even if the inner duct receives the ram air when the motorcycle is cornering, the ram air pressure does not increase because the air passes in the air flow-through holes. Further, hot air from the radiator can be efficiently exhausted.

The increase in the air pressure can be protected even if two divided upper and lower radiators are employed. When the motorcycle is cornering, the increase in the air pressure can be protected by the air flow-through holes provided in the middle surface portion between the meter cover portion and the upper portion of the radiator air conducting open.

The increase in the air pressure around the air exhaust duct is controlled by the air flow-through holes.

The present invention may have a better effect during the straight running of the motorcycle with the closed air flow-through holes. Further, an air pressure control effect can be obtained by the air flow-through holes during the motorcycle cornering. The air flow-through holes are controlled in response to air pressure. As water, such as rain, passes from the outside to the inside of the fairing through the air flow-through holes and falls downwardly along the water protection plate, it does not reach the motorcycle operator. A space is provided between the fairing and the water protection plate, the effect of the present invention can be still obtained because air from the outside can smoothly pass in the space.

Figure 1:
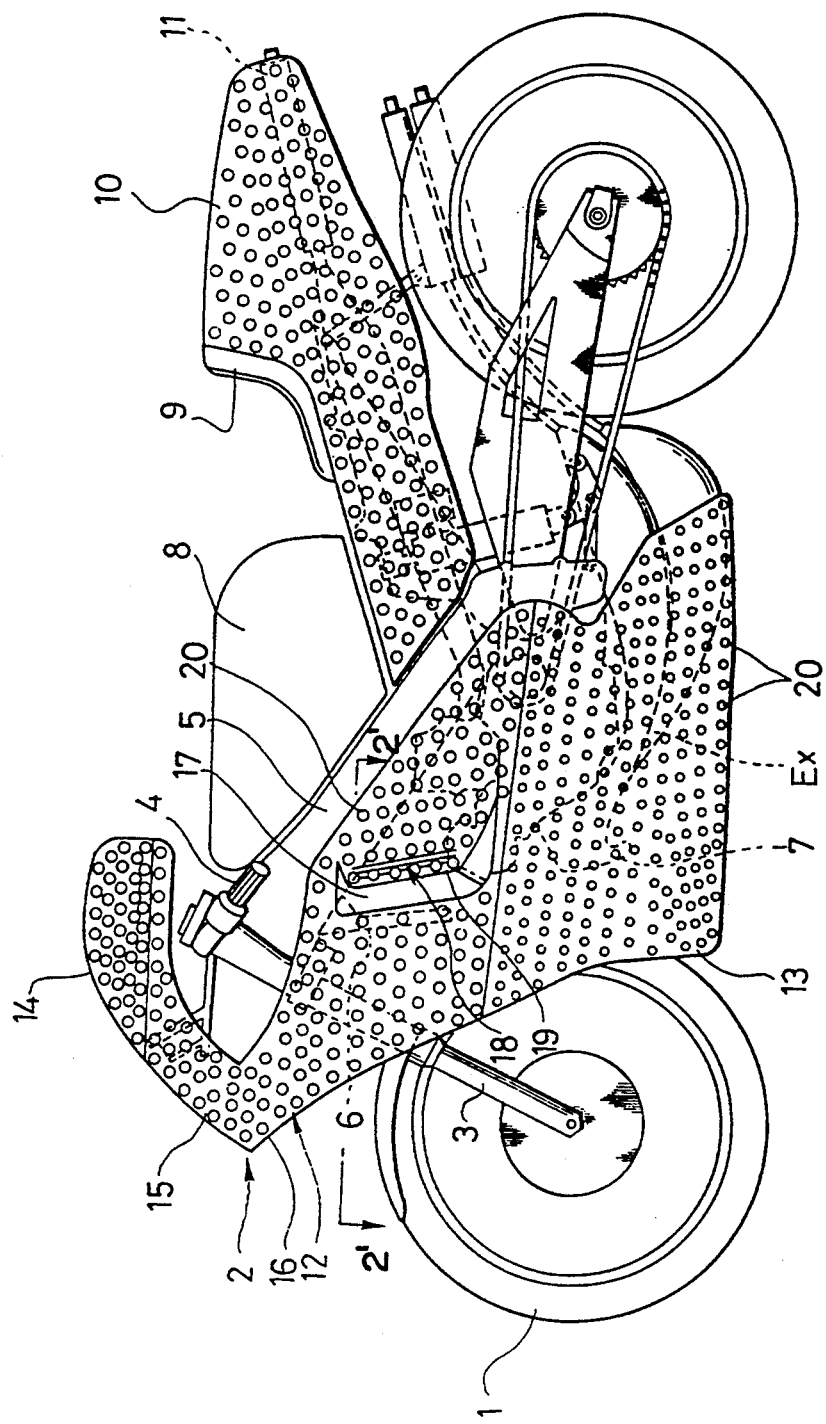
FIG. 1 is an outside view of the motorcycle according to the present invention.
Figure 2:
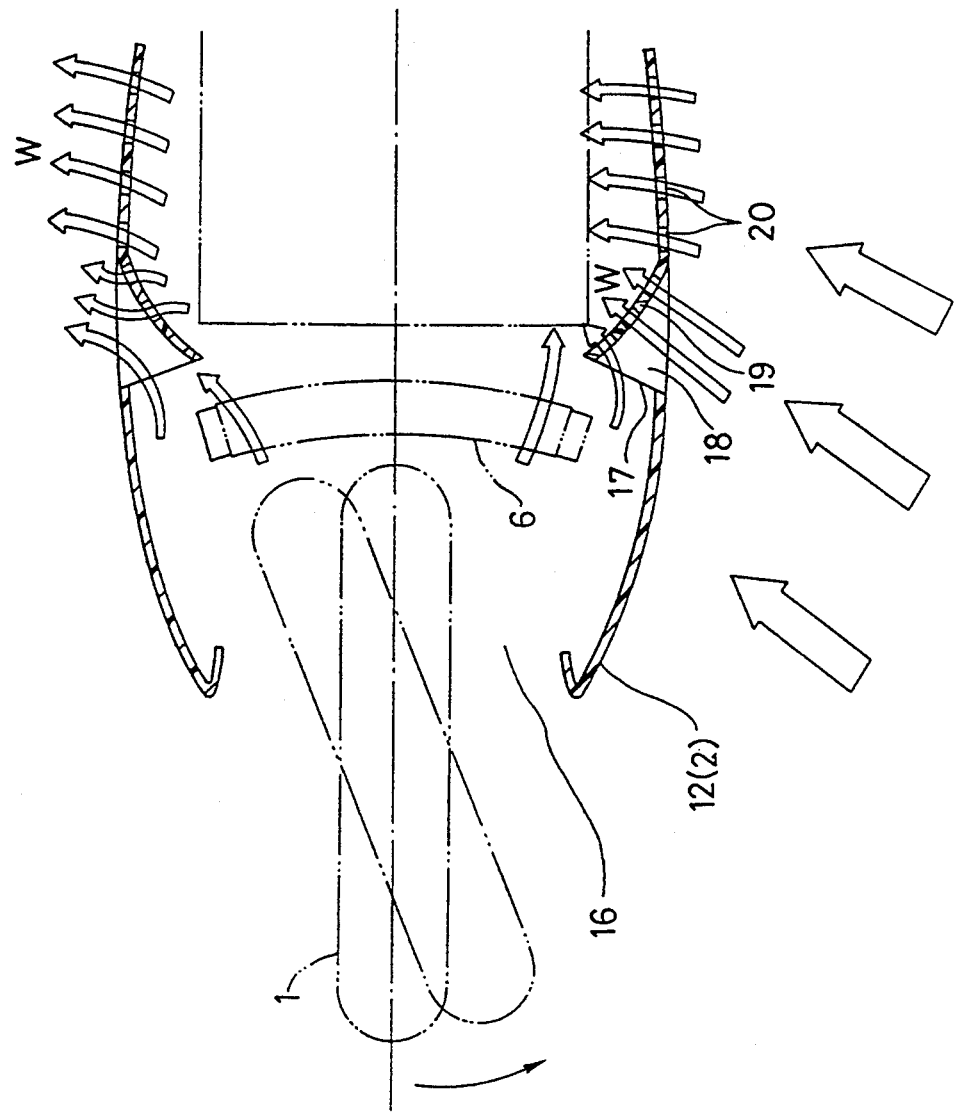
FIG. 2 is a sectional view of the main portion.

FIGS. 1-7 illustrate a first embodiment of the present invention. FIG. 1 illustrates a side view of a racing motorcycle. FIG. 2 illustrates a sectional view taken along 2'—2' of FIG. 1. In FIGS. 1-7, a front wheel 1 is provided on a front fork 3. A handle 4 is connected to a main frame 5. A radiator 6 is operatively connected to an engine 7. An exhaust pipe Ex is provided. A fuel tank 8 is mounted adjacent to a seat 9. A rear cowl 10 is positioned over an upper muffler 11 passing within the rear cowl. A fairing 2 is mounted at the front of the main frame 5.

Figure 8:
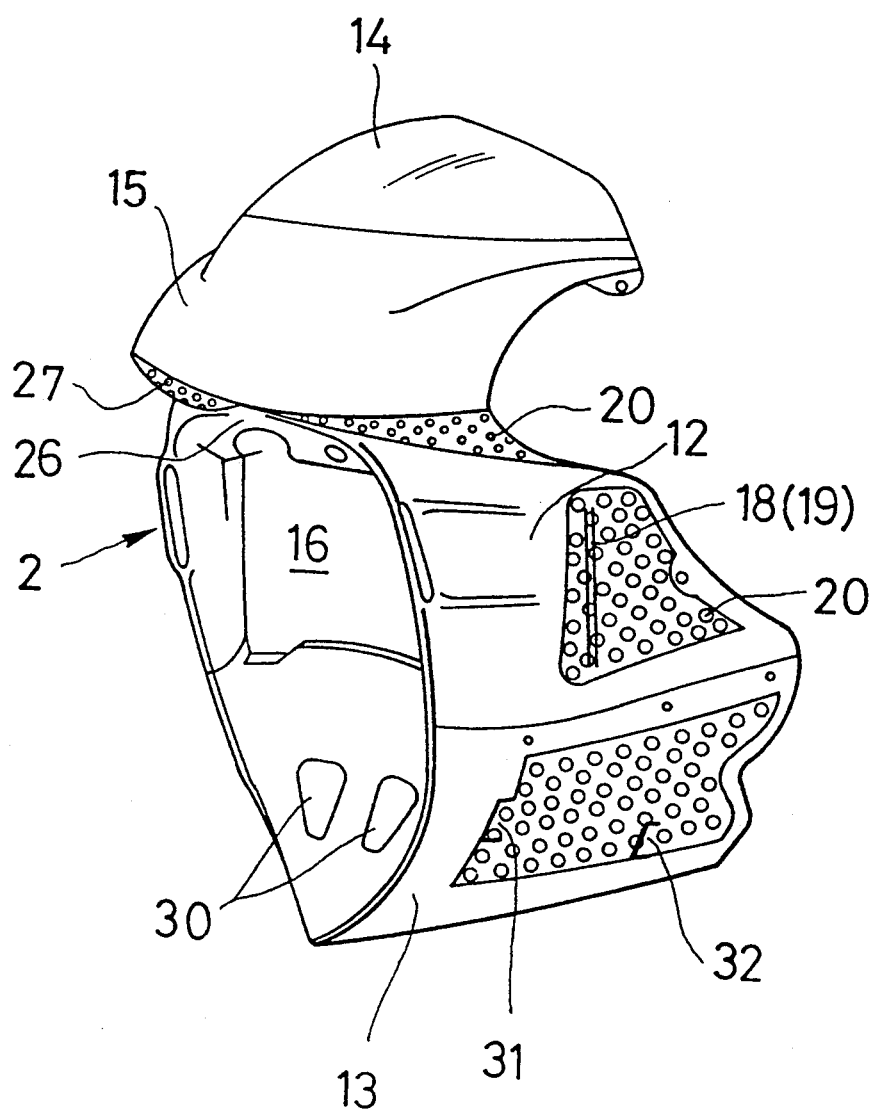
FIG. 8 is a perspective view of a fairing according to a second embodiment of the present invention.

The fairing 2 is constructed of an upper cowl 12 and a lower cowl 13 and covers the upper portion of a front fork 3, the front portion, except for the handle 4, and both sides of the frame lower portion below the fuel tank 8. The fairing 2 can be made integrally as one unit. The upper cowl 12 includes a transparent screen portion 14 in the upper portion thereof and a meter cover portion 15 with the visor function for the meters in the lower portion of the upper cowl 12. Referring to FIG. 8, a large cooling air inlet 16 is constructed at the front portion of the fairing 2 and both of the rear portions thereof extend in a slanting downwardly direction along the main frame 5.

An outlet 17 for the air exhausted from the radiator 6 is provided in both of the side surfaces of the fairing 2 around the rear portion of the radiator 6. The outlet 17 forms an inner duct 18 extending inwardly of the frame. Referring to FIG. 2, the inner duct 18 is made integrally with the fairing 2 and includes a smooth surface 19 with the inward curve at. the front portion thereof. The end portion of the outlet 17 is located adjacent the rear portion of the radiator 6. Multiple air flow-through holes 20 are provided in both the surface of the fairing 2 and the rear cowl 10.

Figure 3:
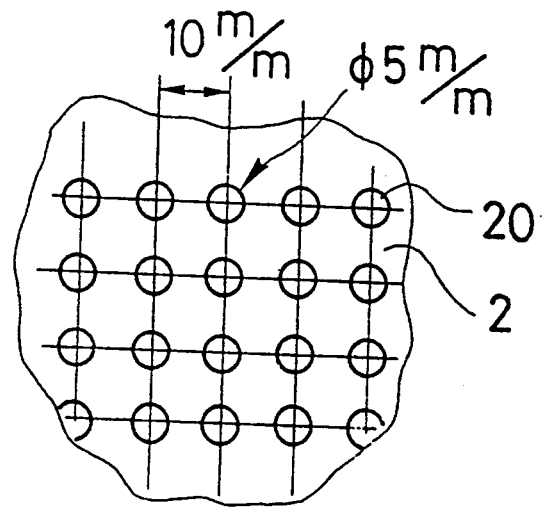
FIG. 3 describes the opening condition of the air flow-through holes.

The air flow-through holes 20 are shown in FIG. 3 in which the center distance between the holes is 10 mm (ten millimeters) and the diameter thereof is 5 mm (five millimeters). The total area of the air flow-through holes is approximately at least 17% (seventeen percent) as compared to the total surface area of the fairing 2 and the rear cowl 10. The air flow-through holes area percentage of 17% is the lowest value to obtain a good effect of controlling the air pressure by the side wind. The highest value is desirable for the mechanical design. However, as the air pressure control effect changes depending upon the outside configuration of the fairing 2, the opening area value should be determined by taking each substantial factor into account. Further, in order to determine the upper limit of the value, the scope which does not sufficiently affect the smooth effect of the fairing must be considered. It is possible to construct various designs to vary the manufacturing method, the spread density thereof and so on for the air flow-through holes 20.

Figure 4:
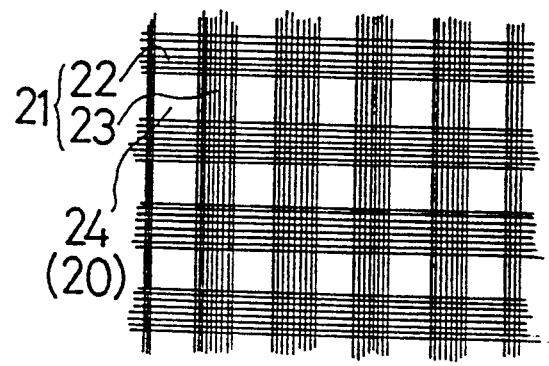
FIG. 4 describes the yarn netted condition to form the air flow-through holes.
Figure 5:
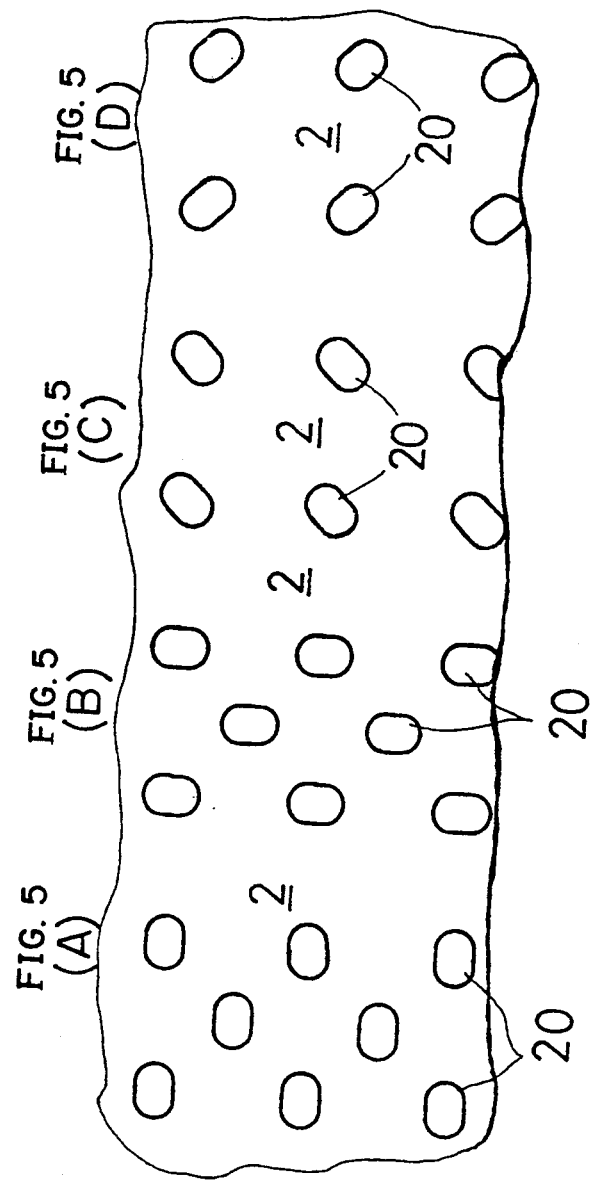
FIGS. 5(A) to 5(D) and 6 show other embodiments of the air flow-through holes.

In FIG. 4, in the case where the fairing 2 is formed of Fiberglass Reinforced Plastic, herinafter referred to as FRP, the netting holes 24 are made by the combination of the transverse yarn and the vertical yarn of the yarn element 21, for example, carbon yarn, kepler yarn. Through the injection molding process, the netting holes 24 are formed as air flow-through holes 20 so that the air flow-through holes 20 can be easily made. Further, the stiffness of the fairing 2 and the rear cowl 10 can be maintained because of no cutting of the yarn element.

FIGS. 5(A) to 5(D) show various slot forms of the air flow-through hole 20. FIG. 5(A) shows the long axis to be transverse. FIG. 5(B) shows the long axis to be vertical. FIG. 5(C) shows the long axis to incline to the right direction. FIG. 5(D) shows the long axis to incline to the left direction. Such arrangements can direct the air flow.

Figure 6:
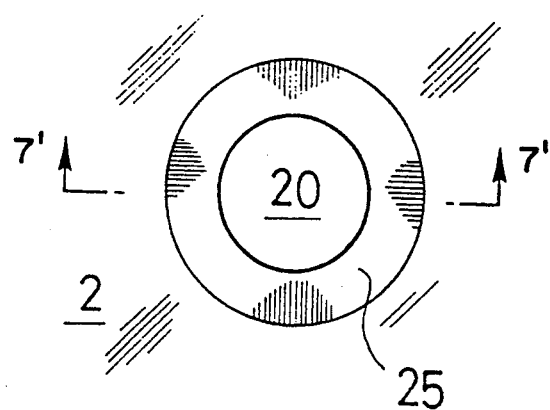
Figure 7:
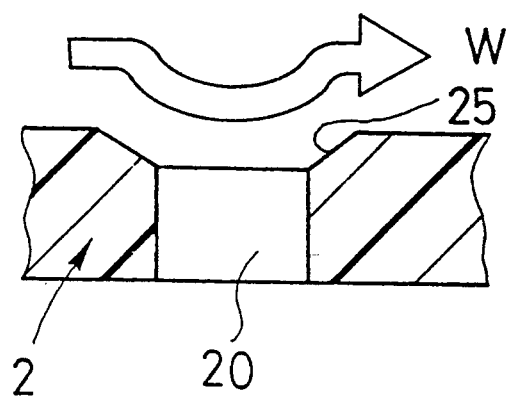
FIG. 7 is a sectional view taken along line 7'—7' of FIG. 6.

FIG. 7 is a sectional view along line 7'—7' of FIG. 6. Both figures are concerned with the hole figure. A conical surface 25 is provided at the entrance of the air flow-through holes 20 so that the ram air can be smoothed along the conical surface 25 to prevent the disturbance of the air and to reduce the air resistance.

The function of the present embodiment will now be described. As shown in FIG. 2, when the motorcycle is banked to the left side to turn left, the side surface of the fairing 2 receives the ram air W as the side wind and the ram air can pass the fairing 2 through the multiple air flow-through holes 20 so that the fairing 2 can reduce the air resistance by the ram air W. As the air flow-through holes are also made in the smooth surface of the inner duct 18, even if the ram air W strikes the smooth surface 19 at a right angle, the running air resistance can be reduced by passing the air flow-through holes. The fairing 2 is particularly effective for a high speed racing machine.

As the air flow capacity within the fairing 2 is increased by the ram air passing the air flow-through holes, it can improve the cooling efficiency of the radiator 6, the engine 7, the exhaust pipe Ex and the frame parts. Further, the ram air entered from the air conducting open for the radiator passes also the air flow-through holes in the smooth surface 19 so that the air can efficiently exhaust the hot air from the radiator.

Figure 9:
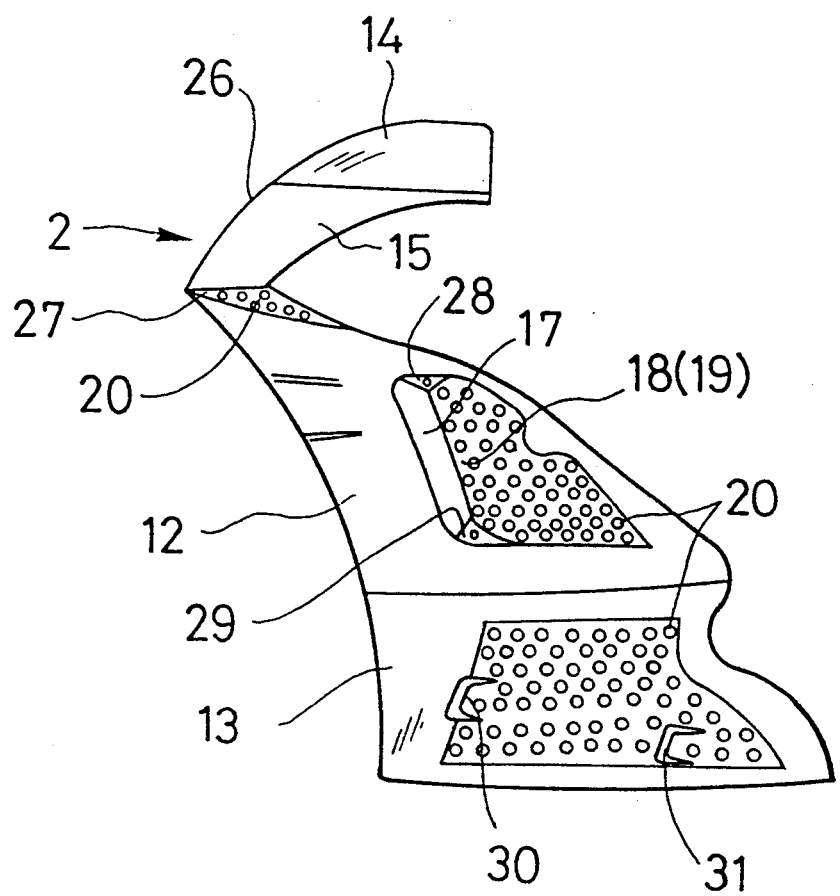
FIG. 9 is a side view thereof.
Figure 10:
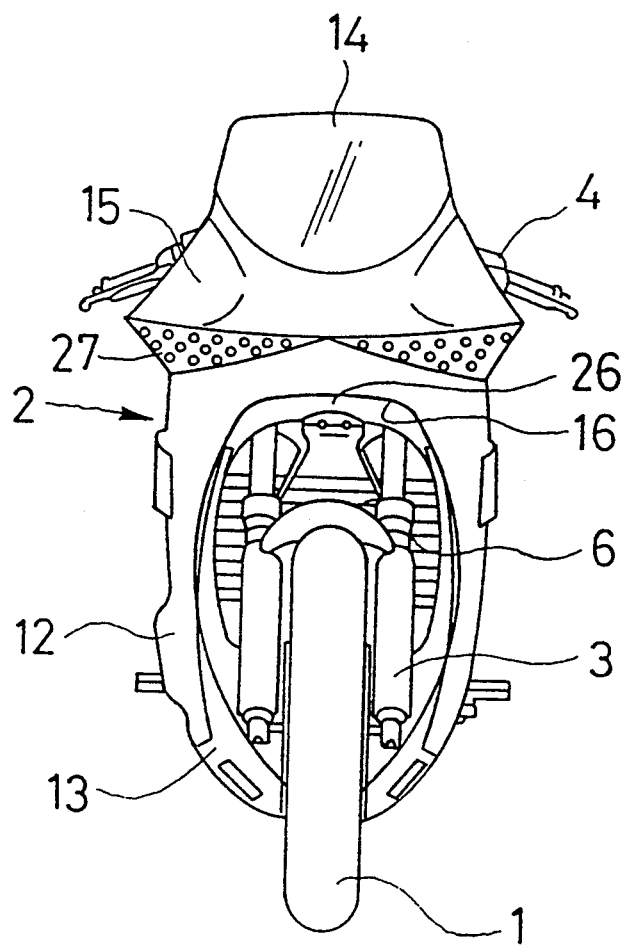
FIG. 10 is a front view of the fairing mounted on a motorcycle.

FIGS. 8–10 illustrate a second embodiment relative to the position of the air flow-through holes 20. FIG. 8 illustrates a perspective view of the fairing 2. FIG. 9 illustrates a side view. FIG. 10 illustrates a front view of the fairing equipped on the motorcycle. The same numerals are used to identify the same function portions in the embodiment of FIGS. 1 and 2. Various kinds of air flow-through holes 20 can be used either alone or in combination with others. Air flow-through holes 20 are provided in the connecting portion 27 between the meter cover portion 15 and the upper portion 26 of the air inlet 16 for the radiator in the upper cowl 12 of the fairing 2. As shown in FIG. 10, the connecting portion 27 is a slightly downwardly inclining surface in which the air flow-through holes 20 are provided. Further, the air flow-through holes 20 are provided in the upper and lower recess walls 28, 29 and the smooth surface 19 of the inner duct 18 to the back line of the upper cowl. A couple of ducts 30 are provided for cooling the exhaust pipe in the front portion of the lower cowl 13 and an air exhaust outlets 31, 32, respectively, in the front portion and the rear portion of the side portion of the lower cowl 13. Further, the air flow-through holes 20 in the side surface of the lower cowl 13 include air exhaust outlets 31, 32.

According to the above-described embodiment, an air pressure increase can be avoided when the motorcycle is banking. Additionally, as the air flow-through holes 20 are restricted to be provided only in the receiving portion of the side wind, the air can obtain a good smooth effect on the fairing 2 when the motorcycle is traveling in a straight direction.

Figure 11:
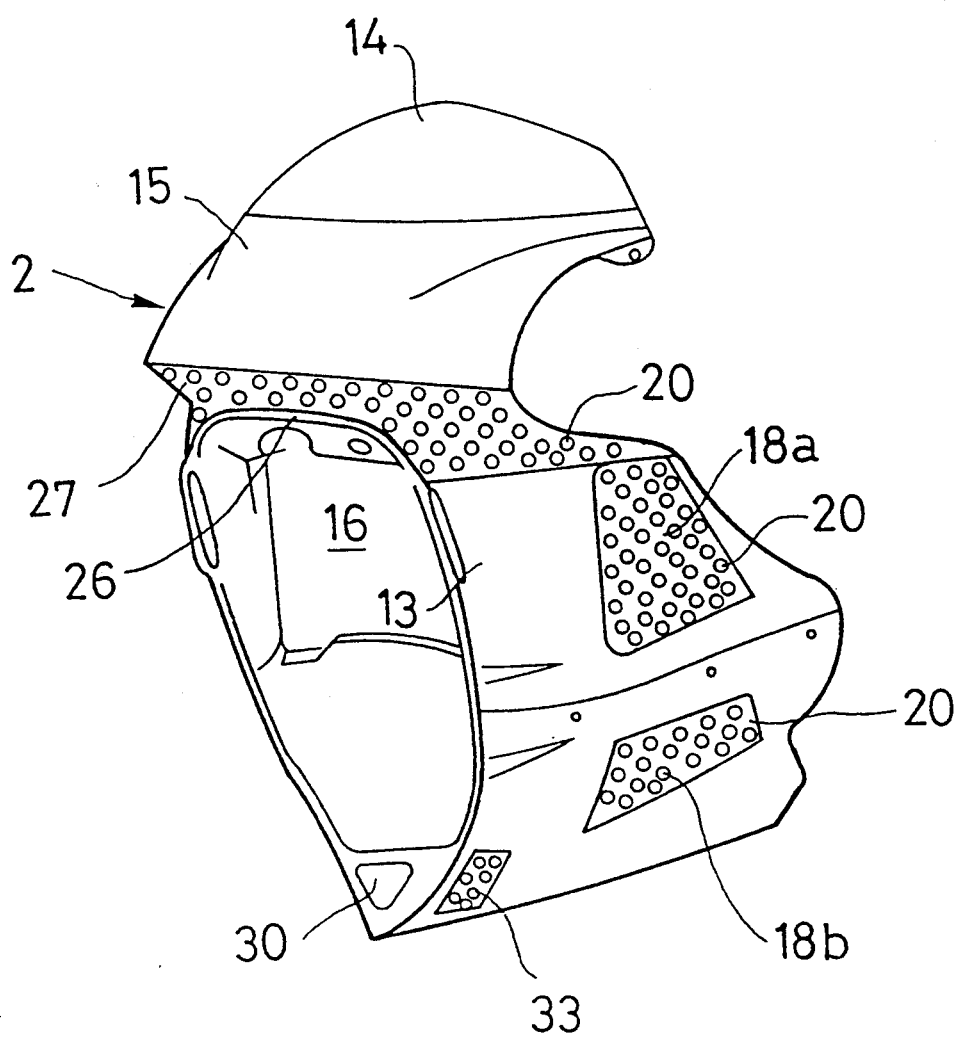
FIG. 11 is a perspective view of a fairing according to a third embodiment of the present invention.
Figure 12:
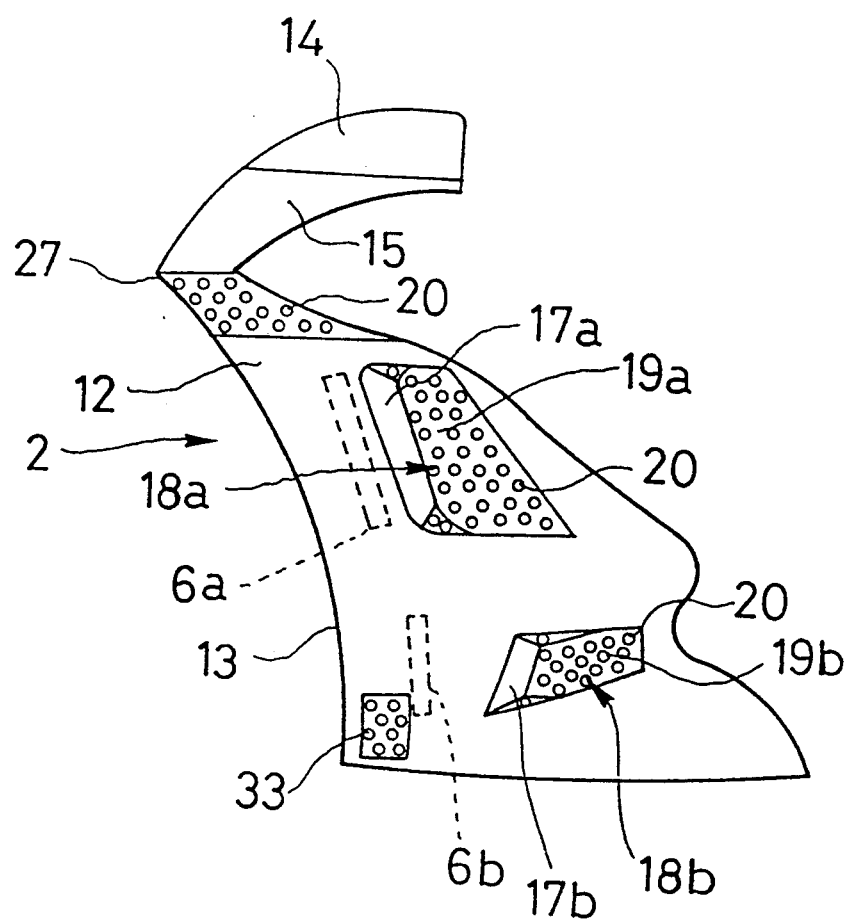
FIG. 12 is a side view thereof.
Figure 13:
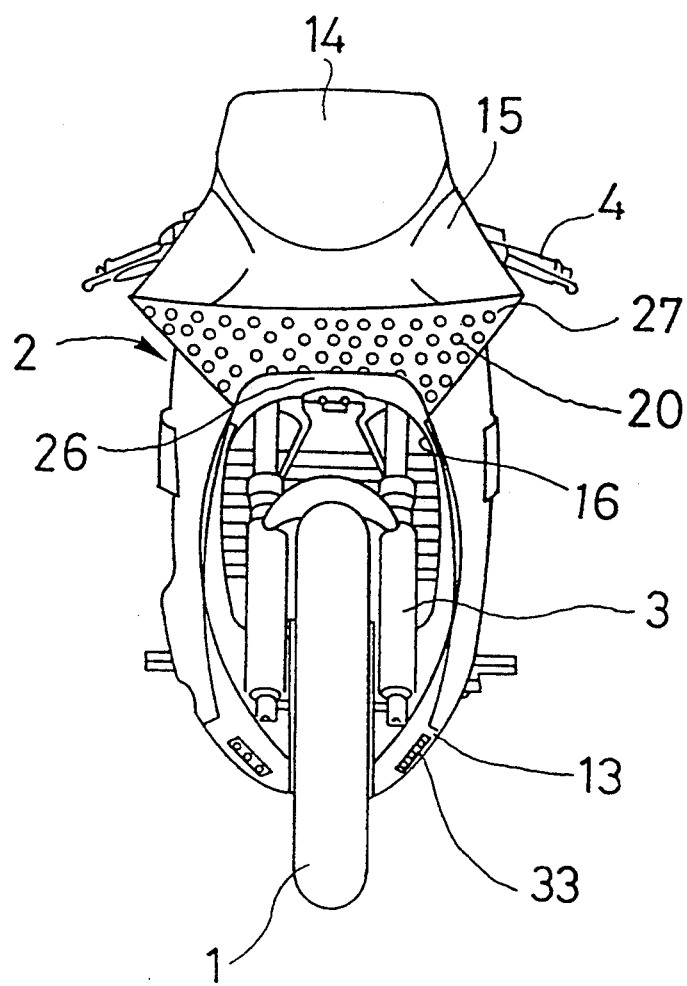
FIG. 13 is a front view of the fairing mounted on a motorcycle.

FIGS. 11–13 illustrate a third embodiment wherein the connection portion 27 is wider at the front portion as shown in FIG. 13 and the radiator is divided into a first radiator 6a and the second radiator 6b in the upper and lower position. The air exhaust outlet is constructed as a first air exhaust outlet 17a and the second air exhaust outlet 17b corresponding to each radiator. The air flow-through holes are constructed in the connecting portion 27, in the first and second inner ducts 18a, 18b adjacent each air exhaust outlet and in the front air conducting portion 33 adjacent the second radiator 6b.

According to the above-described construction, smooth running is obtained when the motorcycle is cornering and the surface area may be restricted to provide the air flow-through holes. Thus, improved cooling efficiency of the second radiator 6b is achieved.

FIGS. 14–24 illustrate embodiments which can open the air flow-through holes. FIGS. 14–18 are a fourth embodiment in which the air flow-through holes 20 can be opened and closed in response to the air pressure. FIG. 14 illustrates a side view of the integrated type fairing 2 in which the air flow-through holes 20 are formed in the substantial center portion of the low fairing side, and an open and close device is provided inside the fairing.

Figure 16:
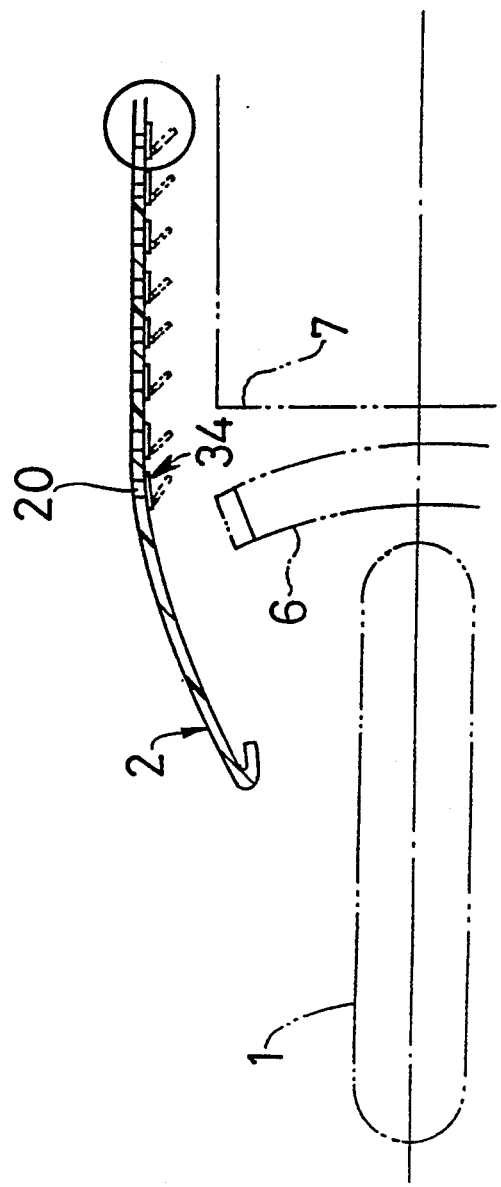
FIG. 16 is a sectional view of the main portion taken along line 16'—16' of FIG. 14.

FIG. 16 is a sectional view along line 16'—16' of FIG. 14. Both FIGS. 15 and 16 illustrate multiple substantial rectangle plate elements which open and close the air flow-through holes 20. The plate element has a portion 35 which can open and close the air flow-through holes 20 and the fitting portion 36 in which the plate element is positioned relative to the fairing 2 by the screw 37. The length of the plate element depends upon the curve degree and so on of the fairing. As illustrated in FIGS. 15A–15C, the plate may be divided into one plate 15(A), two plates 15B or three plates 15C.

Figure 17:
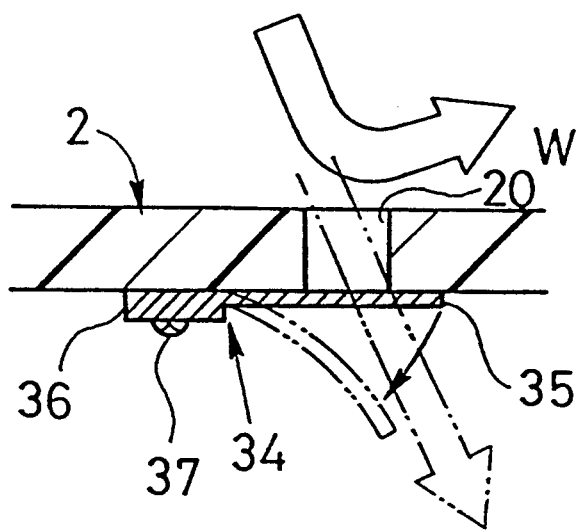
FIGS. 17 and 18 are enlarged sectional views of the main portion.
Figure 18:
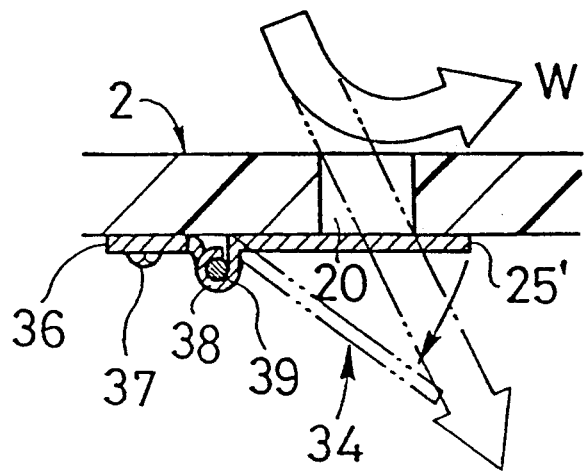

FIG. 17 illustrates a reed valve type plate wherein closure member 34 is a resilient plate element formed by a hinged type plate 35. FIG. 18 shows a hinged type plate in which the open and closed plate 35 includes a hinged member 25' and is swingably connected to a fitting portion 36 by a cowl 38 and a shaft 39. The former is biased closed by the open and close plate 35 itself and the latter is biased closed by a spring according to a predetermined load in order to bias the open and close plate 35 to the fairing 2.

According to the above-described construction, when the motorcycle is running straight, the ram air flows along the outside surface of the fairing 2 because the air flow-through holes 20 are closed as shown in FIGS. 17 and 18. Thus, a running effect occurs as a result of the fairing 2.

When the motorcycle is cornering, the air pressure applied to the open and closed plate 35 increases as the side wind of the ram air. If the air pressure overcomes the predetermined load to bias the open and closed plate 35, it opens inwardly as shown in the dotted line and a part of the ram air passes to the inside of the fairing to control the increase of the air pressure.

According to the present embodiment, it is possible to preset the open and closed controlled air flow-through holes in response to the air pressure which can achieve both a smooth effect during the motorcycle straight running and an air pressure control effect during the motorcycle cornering at the same time.

Figure 19:
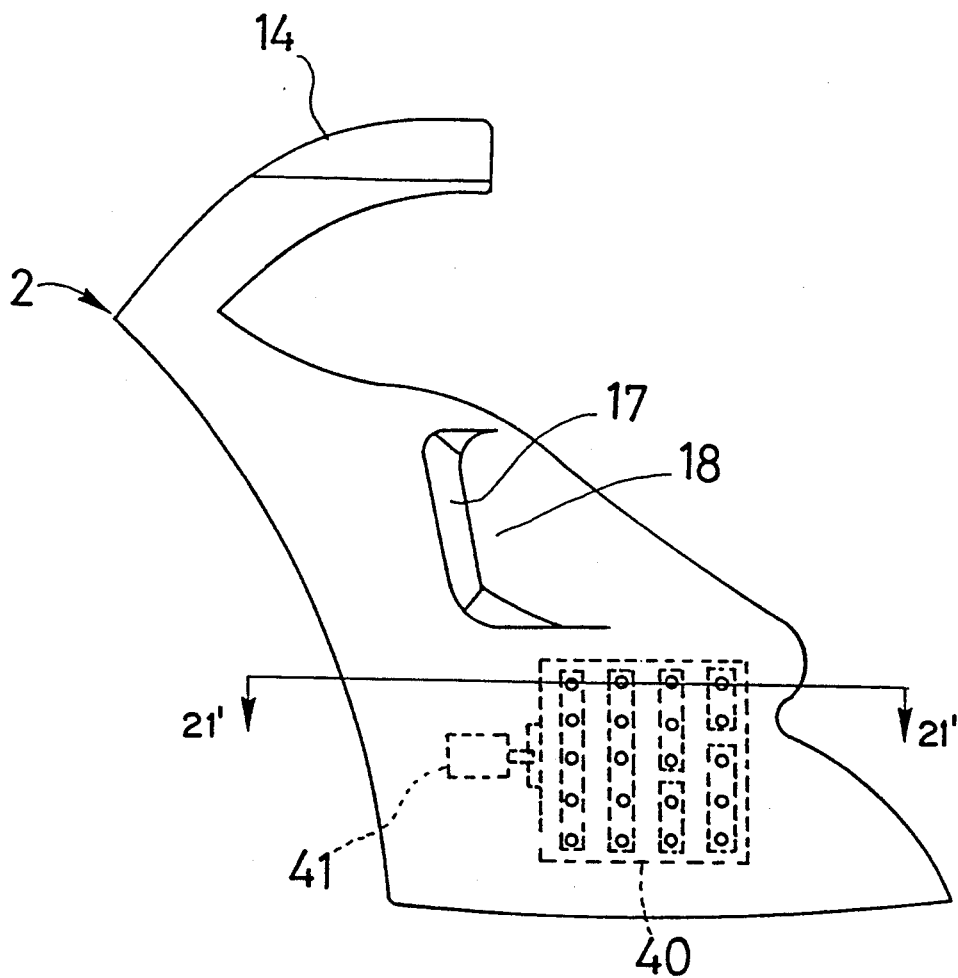
FIG. 19 is a side view of a further embodiment of the air pressure responsive open control air flow-through holes.

FIGS. 19–24 are directed to a fifth embodiment in which the open and close plate element is actuated by an electrical device. As shown in FIG. 19, a slide valve 40 is provided at the air flow-through holes 20 positioned within the fairing 2 and the slide valve 20 is moved by a solenoid 41.

Figure 20:
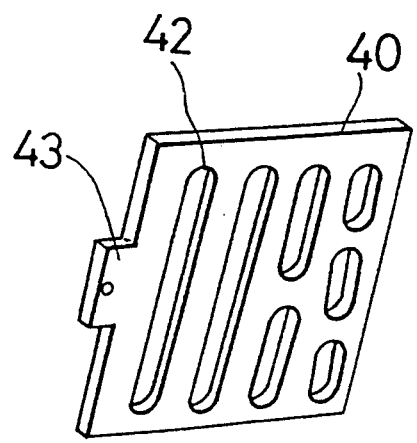
FIG. 20 illustrates the main portion thereof.

As shown in FIG. 20, the slide valve 40 includes vertical slot type openings 42 and a fitting portion 43 at one side thereof. Openings 42 can be altered in length as shown in FIG. 20.

Figure 21:
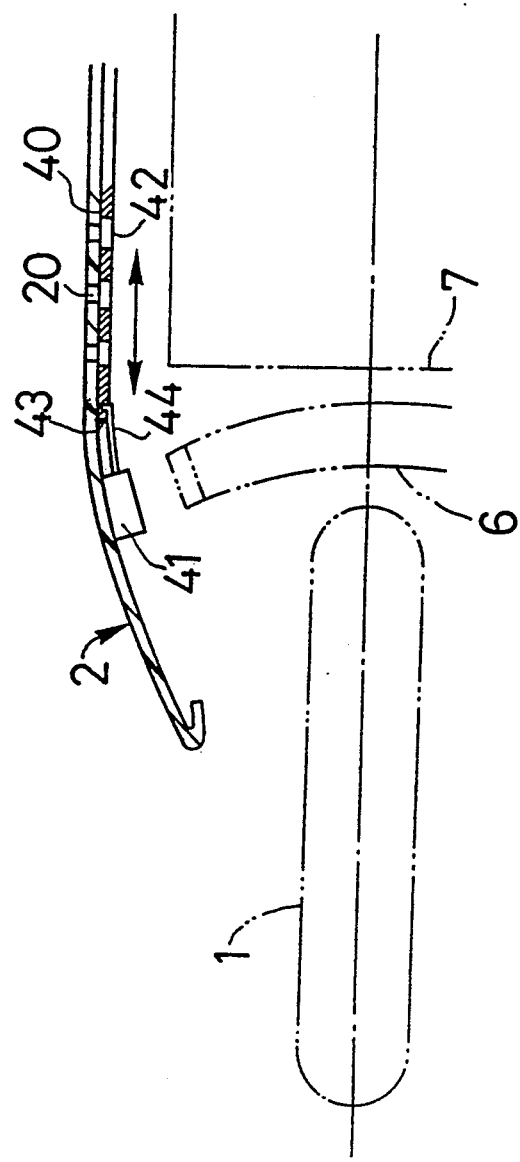
FIG. 21 is a sectional view of the main portion taken along line 21'—21' of FIG. 19.
Figure 22:
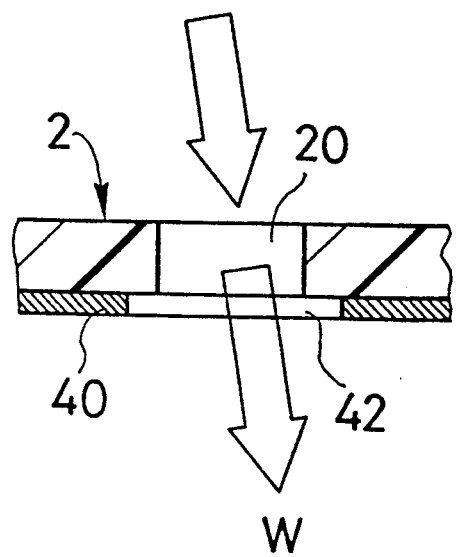
FIGS. 22 and 23 are enlarged section views of the main portion.
Figure 23:
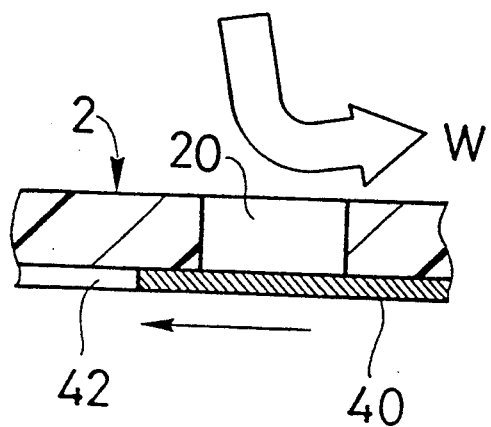

As shown in FIG. 21, the fitting portion 43 of the slide valve 40 is connected to the tip of an actuator 44 which is connected to the solenoid 41 mounted within the fairing 2. When the motorcycle is cornering, the slide valve 40 is moved to open the air flow-through holes 20 through the opening portion 42 as shown in FIG. 22. When the motorcycle is traveling in a straight direction, the opening portion 42 is not in line with the air flow-through holes 20 as shown in FIG. 23.

Figure 24:
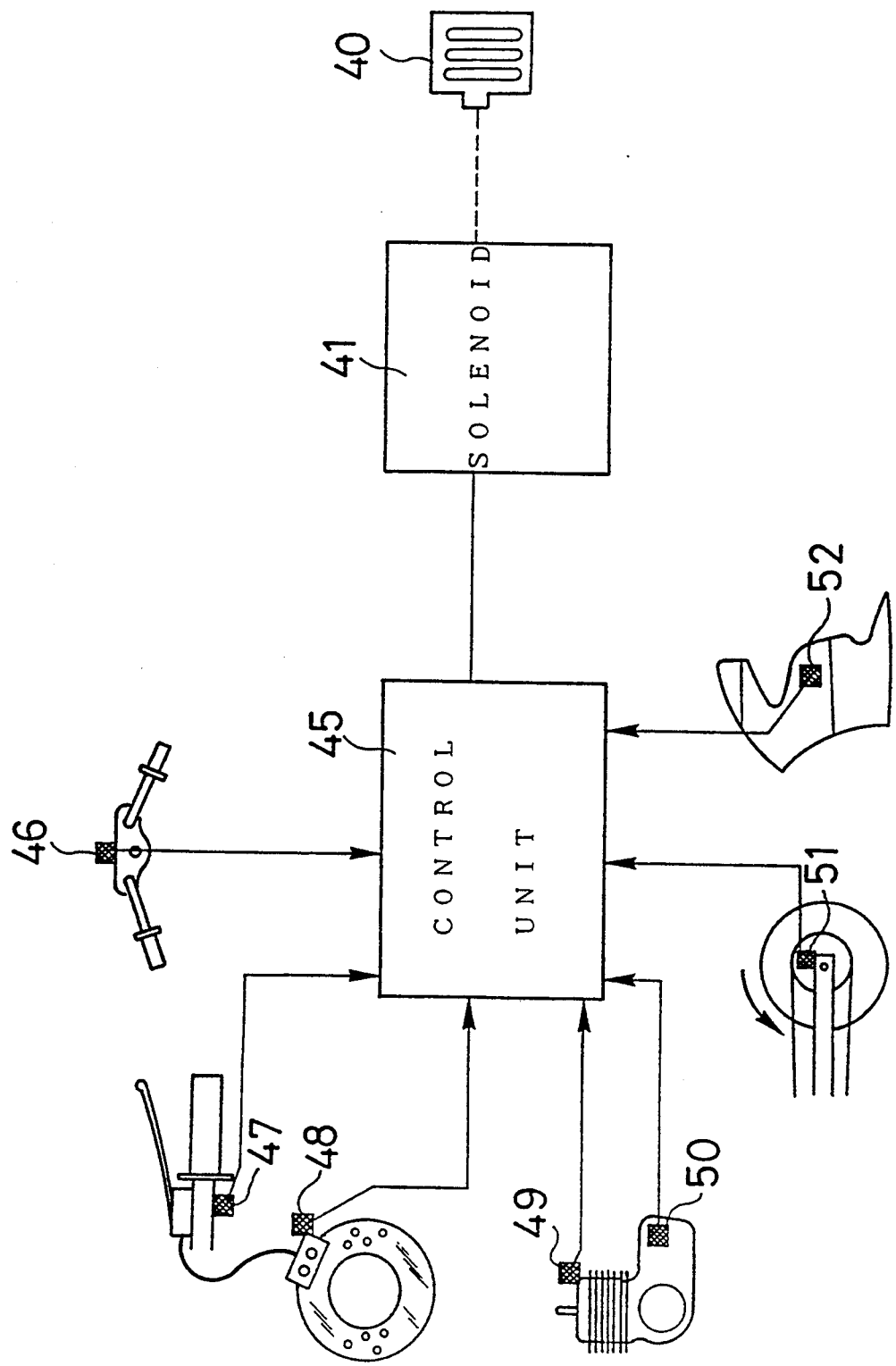
FIG. 24 illustrates the control system.

FIG. 24 shows the control system for the slide valve 40. The solenoid 41 is connected to a control unit constructed to include a micro computer which connects to a steering angle sensor 46 detecting the handle rotating angle, a throttle open sensor 47, a brake switch 48 detecting the brake on and off condition, an engine revolution sensor 49, a gear position sensor 50, a motorcycle speed sensor 51 and a side wind sensor mounted on the fairing.

The following table shows the condition for the sensors and the switched to open of the air flow-through holes 20.

| Detection | Closing of air flow-through hole | Opening of air flow-through hole |
| --- | --- | --- |
| Steering Angle | very small | large |
| Throttle | open | close |
| Brake | not use | use |
| Engine Revolution | high | low |
| Gear Position | high gear | low gear |
| Motorcycle Speed | high | low |
| Side Wind Pressure | less than predetermined value | above predetermine value |

The opening and closing depends on whether the motorcycle is running straight or curving.

In case of employing the electrical system, the electrical motor can be used for the actuating device in spite of the solenoid valve 41 in which it is possible to vary continuously the opening degree of the air flow-through holes 20. In case of controlling the air flow-through holes simply to open or close, the control unit 45 is not required and the solenoid 41 can be directly connected to the sensor or the switch.

Figure 25:
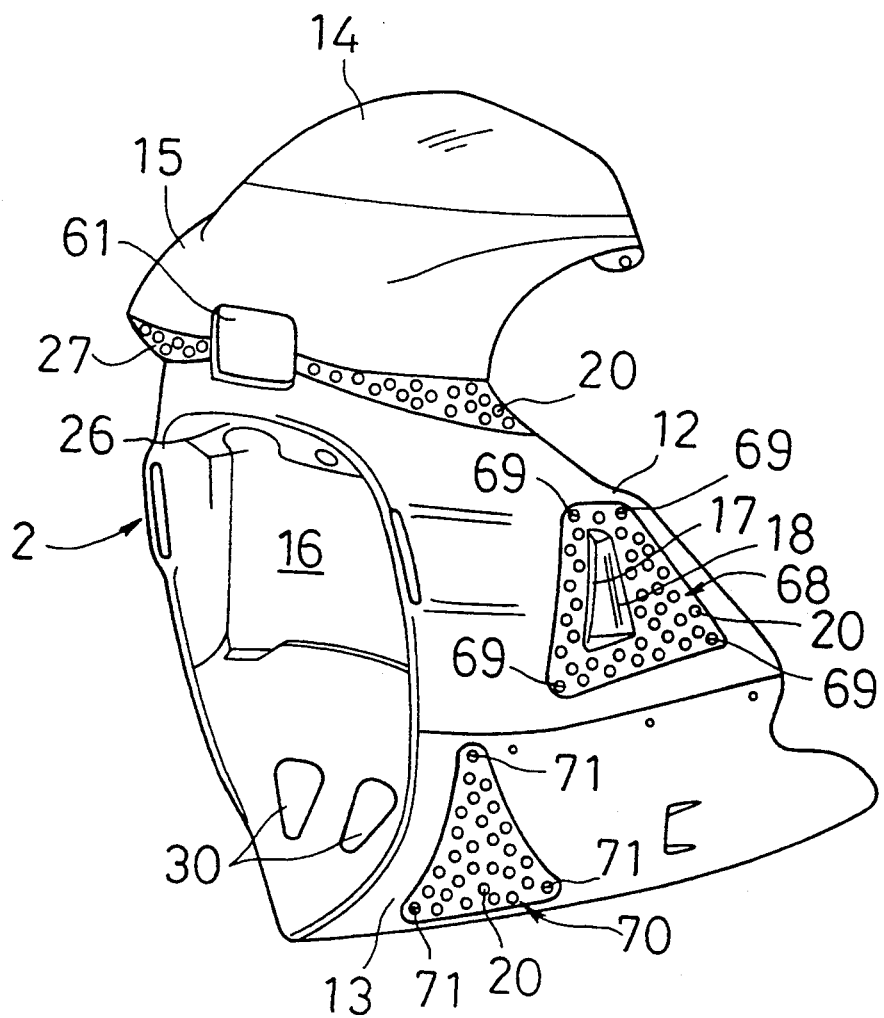
FIG. 25 is a perspective view of a fairing according to a sixth embodiment of the present invention.
Figure 26:
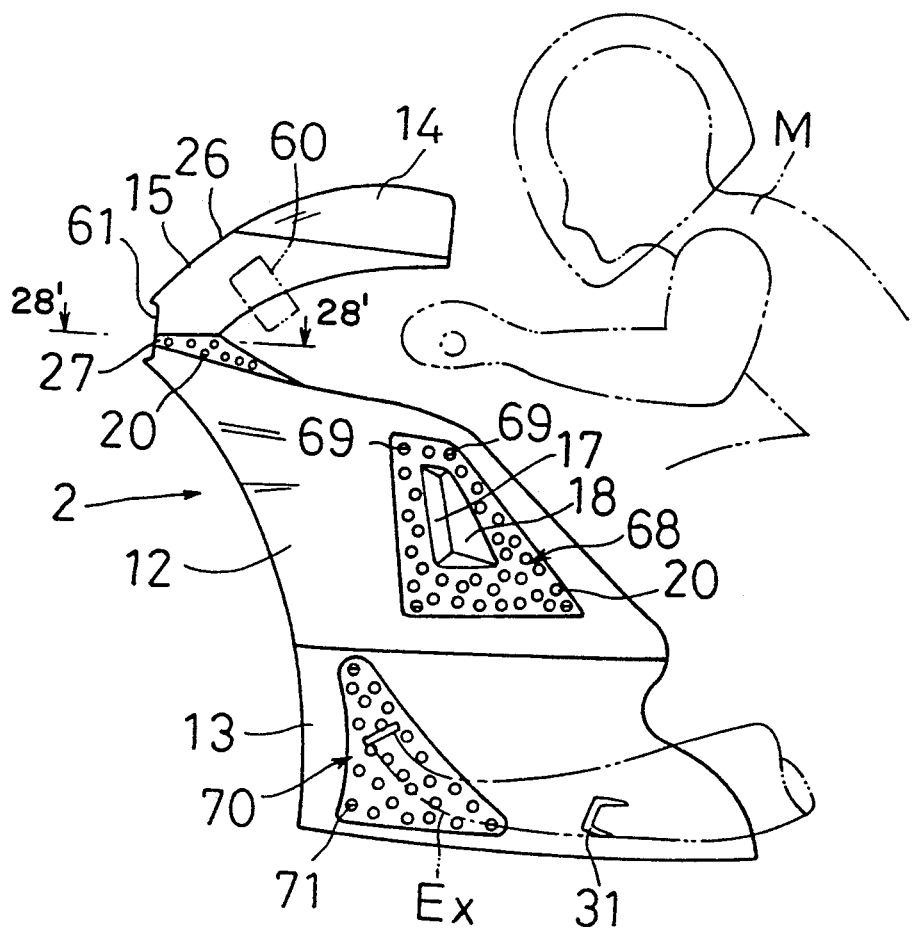
FIG. 26 is a side view of the fairing illustrated in FIG. 25.
Figure 27:
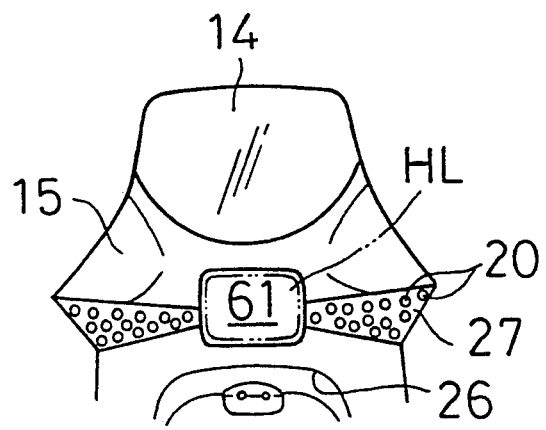
FIG. 27 illustrates an upper front view of the fairing set forth in FIG. 25.

FIGS. 25-30 illustrate a sixth embodiment of the present invention. FIGS. 25-27 correspond to FIGS. 8-10. The air flow-through holes 20 are provided respectively in the downwardly inclining portion of the connecting portion 27 between the meter cover portion 15 and the upper portion 26 of the air conducting opening 16 for the radiator and in the air outlet 17 for exhaust from the radiator, and in the front portion of the side of the lower cowl 13. As shown in FIG. 26, a meter 60 is disposed adjacent to the connecting portion 27 and the front portion of the meter is covered by the meter cover portion 15. An operator M is illustrated in the drawing by the broken line. An opening 61 is provided for a head lamp in the central portion of the connecting portion 27.

Figure 28:
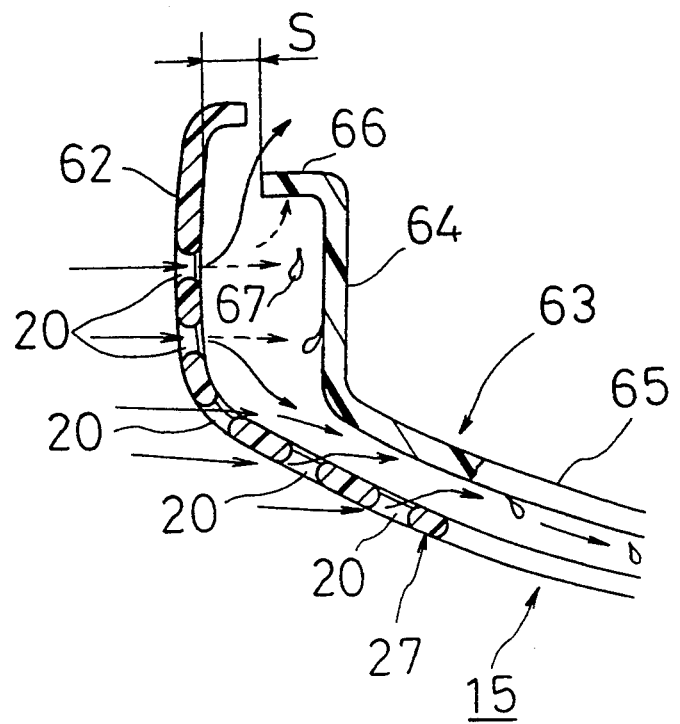
FIG. 28 is an enlarged sectional view along line 28'—28' of FIG. 26.

FIG. 28 corresponds to a sectional view taken along line 28'—28' in FIG. 26, a water protection plate 63 is provided in the front surface portion 62 of the connecting portion 27 spaced a certain distance apart from the fairing 2. The front surface portion 62 is formed in the curved condition corresponding to the connecting portion 27 and has both the front portion 64 extending transversely in parallel with the opening 61 and the side portion 65 extending longitudinally in parallel with the side portion of the connection portion 27.

A turning portion 66 is directed to the front portion 62 formed at the central edge portion of the front surface portion 64 and there is a narrow gap S between the tip edge of the water protection plate 63 and the opening 61. The water protection plate 63 is disposed behind all air flow-through holes 20 made in the front portion 62 so that it can protect to pass the water 67 from the air flow-through holes 20 in the air outlet which are formed in the detachable cover plate 68.

The cover plate 68 is separated from the upper cowl 12 and is made integrally with the air outlet 17 and the inner duct 18 and is further mounted detachably to the upper cowl 12 by a reasonable connecting element 69.

The air flow-through holes 20 in the lower cowl 13 are formed in a cover plate 70 which is detachable such as the cover plate 68 and is mounted detachably to the lower cowl 13 by a connecting element 71. An exhaust pipe Ex adjacent the engine is disposed inside of the lower cowl 13 in which there is provided a cover plate 70.

Figure 29:
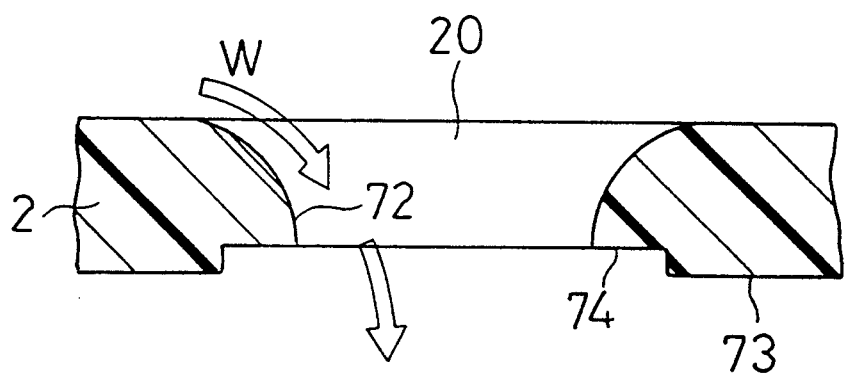
FIG. 29 is an enlarged sectional view of the main portion thereof.

FIG. 29 is an enlarged sectional view of one of the air flow-through holes 20 made in the fairing 2 such as the connecting portion 27, the air outlet 17, the lower cowl 13 and so on and is the corresponding drawing to FIG. 7. The inner wall of the air flow-through hole is formed in the curved opening outwardly to the outside of the fairing and a recess portion 74 from the inner surface 73 is formed in the inside of the fairing 2.

Figure 30:
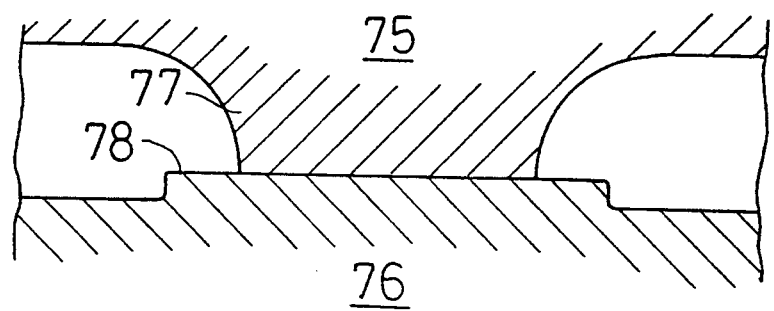
FIG. 30 is the molding method of the main portion as set forth in FIG. 25.

FIG. 30 shows the mold figure for the air flow-through holes 20 in which the upper mold 75 forms the outside surface of the fairing 2 and the lower mold 76 forms the inside surface of the fairing 2. The fairing is made between the upper mold 75 and the lower mold 76 and the air flow-through holes are formed at the same time. The curved surface 72 of the air flow-through holes 20 is formed by the projection 77 from the upper mold and the recess 74 is formed by the step portion 78 in the lower mold 76. The parting line between the upper mold 75 and the lower mold 76 corresponds to the inner surface of the fairing 2 and the tip end of the projection 77 is in contact with the summit portion of the step portion 78.

The function of the present embodiment will be described. In FIG. 28, the water 67 together with the ram air enter into the meter cover portion 15 through the air flow-through holes 20 formed in the front surface portion 62 and collide with the front portion 64 of the water protection plate 63. The water does not reach the operator M and falls downwardly along the water protection plate 63. Further, water 67 from the front portion 64 to the center of the motorcycle is restricted by the returning portion 66 and falls downwardly along the returning portion 66.

Since a certain gap is provided between the water protection plate 63 and the meter cover portion 15, the ram air is not restricted to keep a high cooling efficiency within the fairing 2. As the front space and the rear space of the meter cover portion 15 are communicated by the air flow-through holes in the connecting portion 27, there occurs no negative pressure in the back of the meter cover portion 15 during high speed running of the motorcycle.

As shown in FIG. 26, the cover plate 70 is located along the high temperature exhaust pipe Ex, the cooling effect can be obtained together with air pressure control by the air flow-through holes.

As shown in FIG. 29, the ram air can be passed smoothly by the curved surface 72 in the air flow-through holes. Further, as shown in FIG. 30, the parting line between the projection 77 and the step portion 78 is identical with the inner surface of the fairing 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A fairing for a motorcycle comprising:
   a fairing cover extending from a front end of a frame for a motorcycle rearwardly to cover both sides of an engine operatively mounted adjacent to the front end of the frame of the motorcycle;
   an outlet for air exhausted from a radiator operatively connected to said engine being provided adjacent to a radiator side of the motorcycle;
   an inner duct provided to project inwardly to said frame of the motorcycle to communicate with said outlet; and
   a plurality of small air flow apertures provided at least in a sidewardly curved surface portion of said fairing for reducing air resistance during cornering of the motorcycle;
   wherein said plurality of small air flow apertures are also formed in said inner duct.

2. The fairing according to claim 1, wherein the plurality of air flow apertures are provided in substantially the entire surface of the fairing.

3. The fairing according to claim 1, wherein a surface area occupied by the plurality of air flow apertures is more than approximately seventeen percent of the entire surface area of the fairing.

4. The fairing according to claim 1, wherein said plurality of air flow apertures are formed by apertures in a netted fiber element forming the fairing.

5. The fairing according to claim 1, wherein said plurality of air flow apertures are formed by apertures formed in a slot in an element forming the fairing.

6. The fairing according to claim 1, wherein an opening edge of said plurality of air flow apertures is formed as a cutting edge.

7. The fairing according to claim 1, and further including a front middle portion of said fairing provided adjacent to a meter cover portion of an upper portion of an air conducting opening to a radiator operatively connected to said engine, said front middle portion of said fairing being formed in a downwardly incline and including a plurality of air flow apertures being formed therein.

8. The fairing according to claim 1, wherein said plurality of air flow apertures are formed in an air exhaust duct formed in a front lower portion of a side surface of said fairing.

9. The fairing according to claim 1, wherein a predetermined number of said plurality of air flow apertures are selectively controlled for opening and closing.

10. The fairing according to claim 9, wherein a predetermined number of said plurality of air flow apertures are controlled by an actuating device. responsive to air pressure.

11. The fairing according to claim 9, wherein a predetermined number of said plurality of air flow apertures are controlled by an electrical actuating device.

12. The fairing according to claim 1, and further including a water protection plate disposed within the fairing behind a predetermined number of said plurality of air flow apertures positioned in a forwardly direction.

13. A fairing for a motorcycle comprising:
   a fairing cover extending from a front end of a frame for a motorcycle rearwardly to cover both sides of an engine operatively mounted adjacent to the front end of the frame of the motorcycle; and
   a plurality of air flow apertures provided in said fairing for reducing air resistance during cornering of the motorcycle, said plurality of air flow apertures are provided in substantially the entire surface of the fairing.

14. A fairing for a motorcycle comprising:
   a fairing cover extending from a front end of a frame for a motorcycle rearwardly to cover both sides of an engine operatively mounted adjacent to the front end of the frame of the motorcycle;
   an outlet for air exhausted from a radiator operatively connected to said engine being provided adjacent to a radiator side of the motorcycle;
   an inner duct provided to project inwardly to said frame of the motorcycle to communicate with said outlet, said inner duct having a plurality of small air flow apertures formed therein; and
   a plurality of air flow apertures provided in said fairing for reducing air resistance during cornering of the motorcycle, a surface area occupied by the plurality of the air flow apertures is more than approximately seventeen percent of the entire surface area of the fairing.

15. A fairing for a motorcycle comprising:
   a fairing cover extending from a front end of a frame for a motorcycle rearwardly to cover both sides of an engine operatively mounted adjacent to the front end of the frame of the motorcycle;
   an outlet for air exhausted from a radiator operatively connected to said engine being provided adjacent to a radiator side of the motorcycle;
   an inner duct provided to project inwardly to said frame of the motorcycle to communicate with said outlet, said inner duct having a plurality of small air flow apertures formed therein; and
   a plurality of air flow apertures provided in said fairing for reducing air resistance during cornering of the motorcycle, an opening edge of said plurality of air flow apertures is formed as a cutting edge.

16. A fairing for a motorcycle comprising:
   a fairing cover extending from a front end of a frame for a motorcycle rearwardly to cover both sides of an engine operatively mounted adjacent to the front end of the frame of the motorcycle;
   a plurality of air flow apertures provided in said fairing for reducing air resistance during cornering of the motorcycle; and
   an outlet for air exhausted from a radiator operatively connected to said engine is provided adjacent to a radiator side of the motorcycle and an inner duct is provided being in communication with said outlet to project inwardly to said frame of the motorcycle, a plurality of air flow apertures being formed in said inner duct, said radiator is constructed to include two divided upper and lower radiators and said outlet is disposed to correspond to each of said radiators.

17. A fairing for a motorcycle comprising:
   a fairing cover extending from a front end of a frame for a motorcycle rearwardly to cover both sides of an engine operatively mounted adjacent to the front end of the frame of the motorcycle;

an outlet for air exhausted from a radiator operatively connected to said engine being provided adjacent to a radiator side of the motorcycle;

an inner duct provided to project inwardly to said frame of the motorcycle to communicate with said outlet, said inner duct having a plurality of small air flow apertures formed therein; and a plurality of air flow apertures provided in said fairing for reducing air resistance during cornering of the motorcycle, a predetermined number of said plurality of air flow apertures being selectively controlled for opening and closing.

18. The fairing according to claim 17, wherein a predetermined number of said plurality of air flow apertures are controlled by an actuating device responsive to air pressure.

19. The fairing according to claim 17, wherein a predetermined number of said plurality of air flow apertures are controlled by an electrical actuating device.

* * * * *